Figure 1:
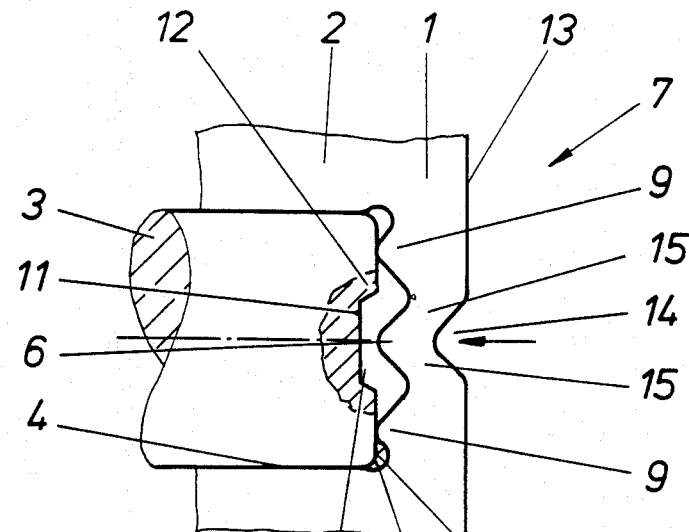

United States Patent [19]

Huttner

[11] Patent Number: 4,710,039
[45] Date of Patent: Dec. 1, 1987

[54] CAGE FOR ROLLER BEARING

[75] Inventor: Klaus Huttner, Heidenfeld, Fed. Rep. of Germany

[73] Assignee: SKF GmbH, Schweinfurt, Fed. Rep. of Germany

[21] Appl. No.: 21,476

[22] Filed: Mar. 4, 1987

[30] Foreign Application Priority Data

Mar. 12, 1986 [DE] Fed. Rep. of Germany ....... 3608184

[51] Int. Cl.[4] .............................................. F16C 33/54
[52] U.S. Cl. .................................... 384/574; 384/575
[58] Field of Search ............... 384/559, 574, 575, 580, 384/572, 565, 576; 29/148.4 C

[56] References Cited

U.S. PATENT DOCUMENTS

| 1,949,824 | 3/1934 | Buckwalter | 384/574 |
| 3,028,658 | 4/1962 | Ortegren | 384/559 |
| 3,144,284 | 8/1964 | Ortegren | 384/574 |
| 3,644,006 | 2/1972 | Feuillat et al. | 384/574 |

Primary Examiner—Lenard A. Footland
Attorney, Agent, or Firm—Rosen, Dainow & Jacobs

[57] ABSTRACT

A roller cage for rollers with end surface depressions has holding projections preformed in the side ring sections thereof in the region of the pockets, in order to avoid a change of diameter of the holding projections and a change of the pocket shape during the shaping of the holding projections. The side ring sections are provided with recesses in the region of the edge of the depressions of the rollers so that no material stretching can occur in these parts of the side ring. The guide projections serve to axially guide the roller.

5 Claims, 2 Drawing Figures

CAGE FOR ROLLER BEARING

This invention relates to a cage for roller bearings, and more in particular to a roller cage in the form of a sleeve of sheet material having closed pockets for receiving cylindrical rollers.

A cage of this type is disclosed in U.S. Pat. No. 3,028,658. This reference disloses a cylindrical sleeve shaped cage formed of sheet metal, for example, a tube. The rollers have depressions at each end, and the ends of the pockets for receiving the rollers are initially rectangular with straight boundary surfaces. After the installation of the roller, a part of the side ring section in the region of a pocket is pressed into the depression of the respective roller by means of a correspondingly shaped stamping tool, and forms therein a holding projection which is especially useful in roller bearing cages which are not as yet installed in bearing rings.

Furthermore the holding projection can also serve for the radial guiding of the cage by the roller. The guiding in the circumferential direction and in the axial direction is mostly reserved for the boundary surfaces of the pockets. During the shaping of the holding projection in the depressions, for example forming the projection out of the material of the side ring section, the remaining end surface portions of the respective roller serve frequently as the end support. The stamping tool is adapted to the width of the depression and deforms the corresponding part of the side ring section. The increased deformation in this region with distance thereby results in the especially strong stretching into the depression on each of the two portions of the side ring opposite the depression, nearly a bending stress in the plastic region, and moreover the resultant stretching of the side ring section. This stretching results from the fact that the material in this zone of the side ring section between the edge of the depression and to the stamping tool is axially stamped and the deformed part of the side ring is stretched collectively. This results thereby in a great enlargement of the pocket width, and thereby the enlarging of the cage diameter and changing of the pocket geometry, especially the running surface for the rollers.

In order to eliminate this problem, it has been attempted to employ stamping tools that are small with respect to the depression width. This results, however, in another problem at the edge of the depression, whereby the axial running surface in the region of the side ring section is greatly impaired and is geometrically changed especially as a result of bending. Furthermore the danger of formation of surface cracks thereby results.

The object of the invention is thereby to provide a roller cage of the above described type, in which neither the diameter nor the shape of the pockets is changed during the formation of the holding projections.

Briefly stated, in accordance with the present invention, this object is achieved by providing an arrangement wherein a running guide projection is provided on each side of the holding projection in the circumferential direction of the roller cage, the guide projections engaging the end surface of the roller radially outside of the depression of the roller, and wherein the transition region between the depression and the radially outer end surface of the roller is axially spaced from the opposed part of the side of the cage.

Both the holding projections and also the guide projections already have one of the suitable functional forms as a result of the formation of the pockets of the cage. The essential point is that a recess is provided between the guide projections and the holding projection intermediate the guide projections, and the recess is positioned in a portion of the side ring that is axially opposite to the edge of the depression, e.g. the transition region between the depression and the radially outer end surface of the roller. This recess must be axially sufficiently deep, that a space, for example a slot, remains after the shaping of the holding projection into the respective depression. Thereby only the guide projections axially support the roller after the shaping of the holding projection, so that it is ensured that the strong stresses, especially the stretching of the side ring sections, due to stamping do not occur. The sections between the guide projections and the holding projection that are used neither for guiding nor for holding are stressed only by bending and stretching in the axial direction by this shaping in the depression with the stamping tool that acts axially on the side surface of the cage. As a result of the shape of the stamping tool it can be achieved that during this work step no substantial circumferential force acts on the guide projection and thereby the influence on the circumference of the cage is avoided. Due to this feature of the invention there is no enlargement of the cage diameter. Also the shape of the pockets of the cage and guide surfaces for the roller are thereby advantageously not changed.

In accordance with a further feature of the invention the side ring section, before the shaping of the holding projection, has, axially extending recesses originating at the side of the roller cage or thereon material projections extending therefrom. Thereby on one hand the effect of the stamping tool on the requisite part section can be concentrated on relatively wide side ring sections or on the other hand weakening in the small side ring section can be avoided, while in the shaping of the holding projections the material projection is axially pushed by flow forming up to the level of the side surface of the cage. Thereby the side ring section maintains its full width also in this region.

In accordance with a still further feature of the invention, the side ring section has the form of an axially equal width wavy winding band with preformed holding projections in the region of a roller between the guide projection before the shaping of the holding projections, whereby the pockets can be undercut in the region of their corners, and the boundary line therefrom can be formed with a curved smooth transition to the guide projection. This feature in accordance with the invention guarantees smooth continuous transitions between the projections and this is the case in the guiding with under cut edges along the entire side ring section. Thereby, after the shaping of the holding projections, it is ensured that sharp edges or the like do not damage the running of the rollers. Furthermore it is ensured that especially the deformed part sections to a relatively great extent are of the same shape and have the same cross section, in order to avoid a concentration of the influence of the deformation to a small region. It is thereby ensured that crack formation, over stretching or the like does not occur.

Figure 2:
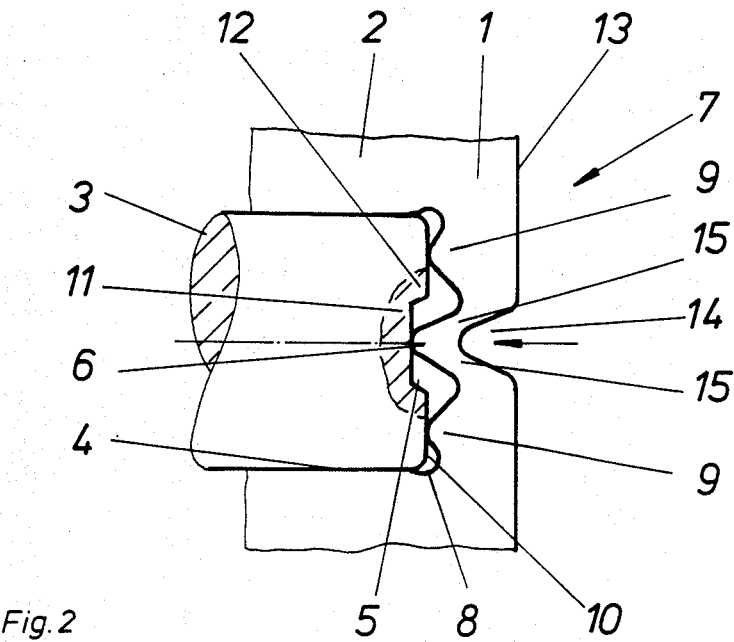

In order that the invention may be more clearly understood, it will now be disclosed in greater detail with reference to the accompanying drawings, wherein:

FIG. 1 is a partial plan view in the region of a pocket of a roller cage for the forming of the holding projections for the roller, in accordance with the invention, and FIG. 2 illustrates the pocket region of the arrangement of FIG. 1 after the forming of the holding projections.

FIGS. 1 and 2 show a section of a roller cage in the region of a pocket. The roller cage has substantially the shape of a cylindrical sleeve, and is produced of sheet metal. It is comprised of side ring 1 and webs 2 connected thereto, so that closed pockets for the rollers 3 are provided. These rollers run on guide surfaces 4 of the webs 2 and are thereby held separated from one another in the circumferential direction of the cage. In order that the rollers 3 cannot fall out radially from the roller cage when the cage is assembled in bearing rings (not shown) in the conventional manner, the ends of the rollers are provided with depressions 5, into which holding projections 6 of the material of the respective side ring section extend.

The roller cage thereby initially has a shape as illustrated in FIG. 1 in the region of the side ring section 7 on both sides of each pocket. On the inner sides of the pockets, at the ends thereof, the pocket has a wavy line shaped boundary surface, which defines a guide projection 9 inwardly from the outer edge 8 and intermediate the holding projection 6 and the edge 8. The guide projection 9 serves as a running surface for the radially extending annular end surface 10 of the roller radially outwardly of the depression 5 of the roller. The holding projection 6 is in the center of the width of the depression 5 and in this illustration is still spaced from the bottom of the depression. As a result of this shape the rim 12 of the depression 5, e.g. the illustrated somewhat conical outer region of the depression 5 of the end surface 10 is spaced from the side ring section 7. A smooth rounded recess 14 is formed in the outer side surface 13 of the side ring 1 as an axial continuation of the holding projection 6. This results in the recess 14 and the holding projection 6 having a substantially equal width in this region of the side ring section 7. The section 15 of the side ring defined by the projection 6 and recess 14 is thereby connected to an equal width portion of the side ring section 7.

The holding projection 6 is molded into the depression 5 with a stamping tool (not shown), which axially engages the recess 14 in the direction of the arrow with a correspondingly shaped end surface. FIG. 2 illustrates the result after this process step. The section 15 is thereby partly bent and partially streched, so that the roller 3 is supported on the guide projection of the side ring 7. No material of the cage comes into contact with the edge 12 of the depression 5, so that furthermore also in the final state of formation of the cage the recess 5 remains spaced from the side ring section 7 as illustrated. The relative positions of the guide projection 9 and the holding projection 6 have also not been changed by the shaping of the holding projection 6.

While the invention has been disclosed and described with reference to a single embodiment, it will be apparent that many variation and modifications may be made therein, and it is therefore intended in the following claims to cover each such variation and modification as falls within the true spirit and scope of the invention.

What is claimed is:

1. In a roller cage, comprised of a substantially cylindrical sheet metal sleeve having closed pockets for receiving rollers, the cage having annular side ring defining the sides of the pockets, the rollers having depressions in their end surfaces, and holding projections extending from said side rings into the recesses of the rollers; the improvement wherein guide projections are provided extending axially into said pockets from said side ring on each side of the respective holding projection, said guide projections engaging annular end surfaces of said rollers radially outside of said recesses, the portion of said cage between said holding projection and guide projections being axially spaced from the transition region of the ends of said rollers between said recesses and the annular end surfaces thereof.

2. The roller cage of claim 1 wherein the side rings of said cage have recesses in their side surfaces axially aligned with said holding projections before the shaping of the holding projections to extend into said recesses of said rollers.

3. The roller cage of claim 1 wherein the side rings of the cage have projections extending axially from the side surfaces of the cage before the shaping of the holding projections.

4. The roller cage of claim 1 wherein the side rings are wave shaped with substantially uniform axial width in the region of a roller between the guide projections before the shaping of the holding projections.

5. The roller cage of claim 1, wherein the corners of said pockets are undercut and have curved smooth transitions to the guide projections.

* * * * *